United States Patent Office 2,858,458
Patented Oct. 28, 1958

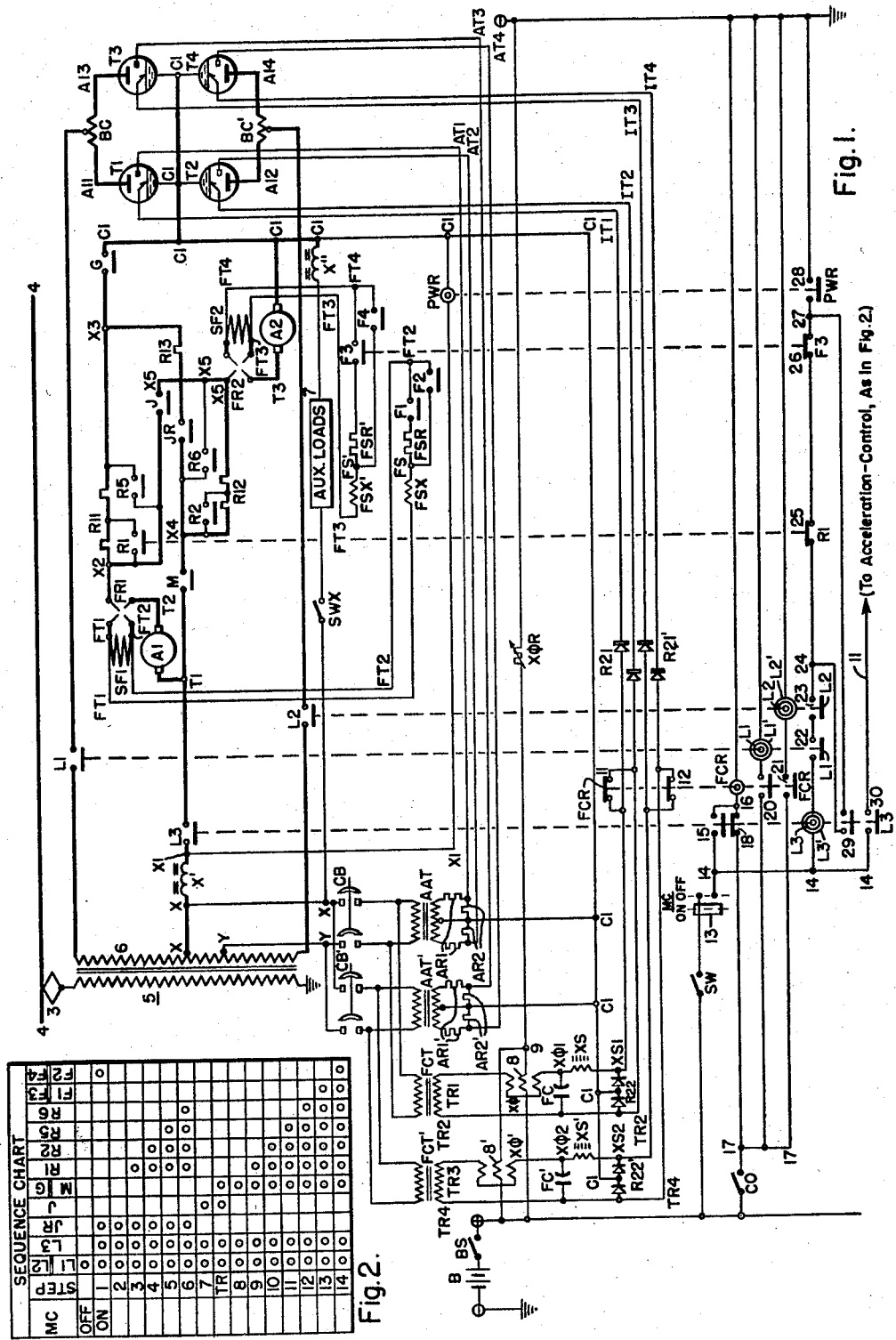

2,858,458

RECTIFIER MOTIVE-POWER WITH AUXILIARY LOADS

Lloyd J. Hibbard, Forest Hills, Pa., assignor to Westinghouse Electric Corporation, East Pittsburgh, Pa., a corporation of Pennsylvania Application August 16, 1957, Serial No. 678,615

4 Claims. (Cl. 307—136)

My invention relates to a rectifier-powered railway-vehicle, or similar installation, in which it is necessary to switch a traction-motor load independently of auxiliary load-devices, when all of the loads are energized from the same ignitron-assembly or other rectifier-assembly which includes a firing or ignition-circuit, or other control-circuit means, for rendering said rectifier-assembly operative or inoperative according as said control-circuit means is in an energizing or deenergizing condition.

My invention relates to a means for first snuffing out the arcs in the rectifier-assembly, or otherwise rendering said assembly inoperative, then opening a switch in the energizing-circuit of the rectifiers, so as to disconnect both the traction-motor load and the auxiliary loads, then making a second circuit-opening switching-operation in the circuit of the traction-motor load, and finally immediately reactivating the rectifier firing-circuits and reclosing the rectifier switching-means, so that the auxiliary loads are automatically reenergized after a very brief time-interval of the order of 0.1 to 0.3 second, more or less, while leaving the traction-motor switching-means open. I perform this operation every time the master controller for the traction-motors is moved from an on-position to an off-position. In this manner, I considerably prolong the lives of the switching-means, by relieving these switching-means of their arc-interrupting duties, and at the same time I impose only a negligibly brief circuit-interruption on the auxiliary load-devices.

In the accompanying drawing, I have illustrated my invention in a desirable exemplary form of embodiment, which is only one of many possible forms of embodiment.

Figure 1 is a much simplified diagram of circuits and apparatus showing the essential features of my invention; and Fig. 2 is a sequence-chart of an exemplary acceleration-control, which is typical of the motor-controlling operations which may be effected after the on-and-off switching-operations have been made with the aid of arc-snuffing or its equivalent.

Figure 1 illustrates the essential features of my invention, as embodied in the electrical equipment which is carried by a self-propelled railway-car or vehicle, which is provided with a pantograph 3 or other current-collecting device which is adapted to receive power from an alternating-current trolley-wire or third rail 4. The car is provided with a main transformer 5, the primary winding of which is connected between the pantograph 3 and ground. The transformer 5 is shown as having a secondary winding 6 which is provided with a midtap X and an auxiliary intermediate tap Y which is spaced from the midtap X. The secondary winding 6 serves as an alternating-current supply-circuit for the rectified-power apparatus on the car, as will now be described.

Thus, the two secondary-winding terminals of the main transformer 5 are connected, through line-switches L1 and L2, respectively, to the midtaps of two balancing coils BC and BC′, which are used because the rectifier-assembly which I prefer to use is a parallel-circuit assembly using two pairs of positively and negatively connected ignitrons or other rectifier-tubes T1, T2 and T3, T4. Thus, the terminals of the balance-coil BC are connected to the anode-leads A11 and A13 of the tubes T1 and T3, and the terminals of the other balance-coil BC′ are connected to the anode-leads A12 and A14 of the tubes T2 and T4, respectively. The four cathode-leads of these four ignitrons are connected to a common cathode-circuit C1, which constitutes the positive direct-current output-circuit for the rectifier-assembly. The negative terminal of this rectifier output-circuit is the midtap X of the transformer-secondary 6.

The rectifier output-circuit C1—X is used as a common rectified-power circuit, to supply rectified power for a main traction-motor load-device, which is represented, in simplified form, as comprising two direct-current traction-motor armatures A1 and A2, and also to supply rectified power for one or more auxiliary loads, which are indicated at 7.

The energizing circuit for the traction-motor load may be traced from the negative direct-current circuit-terminal X, and thence through a choke-coil X′, an intermediate circuit X1, a motor-circuit switch L3, an armature-terminal T1, the armature A1 of a series direct-current traction-motor, an armature-terminal T2, a field-reverser FR1, the series field-winding SF1 for exciting the motor-armature A1, the reverser FR1 again, an intermediate terminal X2, an accelerating resistance R11, an intermediate terminal X3, and a motor-circuit switch G, to the positive direct-current circuit-terminal C1. A second motor-circuit is traceable from the armature-terminal T1 through a motor-circuit switch M to an intermdeiate circuit X4, and thence through an accelerating resistance R12, an intermediate terminal X5, a field-reverser FR2, a second series-field winding SF2 for energizing the second motor-armature A2, the field-reverser FR2 again, an armature terminal T3, and the second motor-armature A2, to the positive direct-current circuit-terminal C1. When the motor-circuit switches G and M are closed, the series direct-current traction-motors A1 and A2 are connected in parallel with each other. When these two parallel-connection switches M and G are both open, a series motor-circuit connection may be made between the intermediate connection-points X3 and X4, through a series-connection switch JR and an accelerating resistance R13. During transition from the series motor-connection to the parallel motor-connection, a transition-switch J is closed, between the circuits X2 and X5. These motor-circuit connections are in accordance with a well-known control-system.

The motor-controlling acceleration-equipment also includes switches R1 and R5 which are used to short-circuit successive portions of the resistance R11, and switches R2 and R6 which are used to short-circuit successive portions of the resistance R12.

For extending the high-speed range of the motors, in the parallel motor connection, field-shunting circuits are provided, in accordance with a known system. Thus, the field-winding terminals FT1 and FT2 of the series field windings SF1 are shunted by a field-shunting circuit which may be traced from the terminal FT1 through a field-shunting reactance FSX, an intermediate field-shunt terminal FS, a field-shunting resistance FSR, and a field-switch F1, to the terminal FT2; and the field-shunt resistance FSR can be short-circuited by a second field-switch F2. In like manner, the field-winding terminals FT3 and FT4 of the series field winding SF2 are shunted by a circuit which may be traced from the terminal FT3 through a field-shunting reactance FSX′, an intermediate field-shunt terminal FS', a field-shunting resistance FSR', and a field-switch F3, to the terminal FT4; and the field-shunting resistance FSR' may be short-circuited by a second field-switch F4.

The energizing-circuit for the auxiliary loads 7 may be traced from the negative direct-current circuit-terminal X through an auxiliary switch SWX and an auxiliary choke coil X" and thence to the positive direct-current circuit-terminal C1.

In practicing my invention, it is necessary that the rectifier-assembly T1 to T4 shall be made up of rectifying elements, which are shown as ignitrons, but which may be regarded as symbolic of any rectifier-elements which include a control-circuit means for rendering the rectifier-assembly operative or inoperative according as said control-circuit means is in an energizing or a deenergizing condition. In the case of ignitrons, this control-circuit means includes firing or ignitor-circuits IT1 to IT4, respectively, for rendering the respective rectifiers conductive at the beginning of each conducting half-cycle. It is also desirable, as shown, to provide each of the four rectifiers T1 to T4 with an auxiliary-anode circuit AT1 to AT4, respectively, for stabilizing the light-load operation of the rectifiers.

Control-power for energizing the firing or ignition-circuits IT1–IT4 and the auxiliary-anode circiuts AT1–AT4 is obtained from the tap-points X and Y of the secondary winding 6 of the main transformer 5. Control-circuit power for the first pair of rectifiers T1 and T2 is obtained from the terminals X and Y through a circuit breaker CB; while the corresponding control-circuit power for the parallel connected tubes T3 and T4 is obtained from the taps X and Y through a second circuit breaker CB'. These circuit breakers CB and CB' energize two auxiliary-anode transformers AAT and AAT', and two firing-circuit transformers FCT and FCT', all four of these transformers having separate insulated primary and secondary windings.

The secondary windings of the auxiliary-anode transformers AAT and AAT' are provided with mid-taps which are connected to the cathode circuit C1. The secondary-winding terminals of these auxiliary-anode transformers AAT and AAT' are connected, through individual resistances AR1 and AR1', to the auxiliary-anode terminals AT1, AT2 of the first pair of tubes T1 and T2, and the auxiliary-anode terminals AT3, AT4 of the second pair of tubes T3 and T4, respectively. Other resistances AR2 and AR2' are also connected between the respective auxiliary-anode terminals AT1 to AT4 and the common cathode-circuit C1.

The secondary-winding terminals of the firing-circuit transformers FCT and FCT' are indicated at TR1 to TR4. The secondary terminals TR1 and TR3 are connected, through phase-shifting reactors $X\phi$ and $X\phi'$, to intermediate terminals $X\phi 1$ and $X\phi 2$ respectively, and then on, through saturating reactors XS and XS', to conductors XS1 and XS2, respectively. The phase-shifting reactors $X\phi$ and $X\phi'$ have variably excited saturating-windings 8 and 8' respectively, which receive direct-current energization through a parallel-circuit connection, as shown at 9, in series with a controllable resistance $X\phi R$.

The intermediate terminal $X\phi 1$ is connected to the transformer-terminal TR2 through a firing capacitor FC; while the intermediate terminal $X\phi 2$ is connected to the transformer-terminal TR4 through a second firing capacitor FC'. The terminals XS1, TR2 and XS2, TR4 are connected to the four firing or ignitor-circuit terminals IT1 to IT4, respectively, by two pairs of rectifiers R21 and R21', respectively, which transmit positive impulses of firing-circuit power to the respective ignitors whenever the respective firing capacitors FC and FC' are discharged by the saturation of the saturating reactors XS and XS', respectively, during each half-cycle of the secondary outputs of the respective firing-circuit transformers FCT and FCT', these firing circuits being completed by two pairs of rectifiers R22 and R22', the mid-connection points of which are connected to the cathode-circuit C1 in a well-known manner. Each of the ignitrons T1 to T4 is thus fired in each conducting half-cycle as its ignitor circuit is energized.

My invention uses a fast firing-circuit relay FCR, which is provided with two back-contacts 11 and 12 which are closed when the relay is deenergized. The FCR back-contact 11 is connected between the circuits XS1 and TR2, for short-circuiting or incapacitating the firing or ignition-circuits of the first pair of rectifier tubes T1 and T2; while the FCR back-contact 12 is connected across the circuits XS2 and TR4 for short-circuiting or incapacitating the firing or ignition-circuits of the second pair of rectifier tubes T3 and T4.

The illustrated car-equipment is shown as having a stand-by source of direct-current control-energy, shown in the form of a battery B, which is connected, through a battery-switch BS, between positive and negative control-circuit buses (+) and (−).

It is necessary to provide some sort of master controller MC whereby the motorman can control the traction-motors A1 and A2. In the drawing, this master controller MC is shown as a very much simplified electrical controlling-means having an on-position and an off-position. In its on-position, the controller MC completes a circuit from the positive bus (+), through a control-switch SW, and through a master-controller contact-segment 13, to a circuit 14, and then through an auxiliary make-contact 15 of the motor-circuit line-switch L3, to an energizing-circuit 16 which energizes the operating-coil FCR of the firing-circuit relay FCR.

All of the electrically controlled relays and switches which are shown in the drawing are diagrammatically indicated as having vertical switch-stems (indicated by dotted lines), which are biased by gravity toward their lowermost positions, and all of these relays and switches are shown in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

My illustrated car is shown as being intended to be operated as a unit of a multiple-unit train, in which case each car is provided with an individual car cut-out switch CO, whereby the traction motors A1 and A2 of that car may be cut out of service, making that car operate as a trailer. This cut-out switch CO is shown as being connected between the positive bus (+) and a circuit 17 which extends on, through an auxiliary back-contact 18 of the motor-circuit line-switch L3, to the previously mentioned conductor 16 which energizes the firing-circuit relay FCR.

The circuit 17 also has a branch-circuit which extends through a make-contact 20 of the firing-circuit relay FCR, and thence through the operating-coil L1 of the rectifier-circuit line switch L1, and on to the negative bus (−). The aforesaid circuit 17 also has another branch which extends through a make-contact 21 of the firing-circuit relay FCR, and thence through the actuating-coil L2 of the rectifier-circuit line switch L2, and on to the negative bus (−).

The rectifier-circuit line-switches L1 and L2 are schematically indicated as if they had slug-rings L1' and L2', respectively, which are intended to be a means for schematically indicating, at a glance, that these two line-switches L1 and L2 are main-circuit or heavy-duty contactors, which inherently have more inertia, and operate slightly more slowly, than the light-weight light-duty firing-circuit relay FCR. It is not intended, by this manner of illustration, to indicate that the main-circuit switches or contactors L1 and L2 are slow; on the contrary, they are made to operate as fast as possible, for such large contactors.

The previously mentioned circuit 14 has a branch-circuit which extends through the operating-coil L3 of the motor-circuit line-switch L3, and thence on, through an L1 make-contact 22, and an L2 make-contact 23, to a circuit 24, and thence on, through an R1 auxiliary back-contact 25 and an F3 auxiliary back-contact 26, to a circuit 27, and thence on, through a make-contact 28 of a power-relay PWR, to the negative bus (—). The power-relay PWR has an actuating-coil PWR which is connected between the circuits X1 and C1 so that this relay is energized whenever rectified power is available for the operation of the traction-motors A1 and A2.

The motor-circuit line-switch L3 is symbolically indicated as if it had a heavier slug-ring L3' which is heavier than the symbolic slug-rings L1' and L2' of the rectifier-circuit line-switch L1 and L2. This is intended as a symbolic means for indicating that the motor-circuit line-switch L3 has a longer, or more sluggish, drop-out time or action, for moving from a closed switch-position to an open switch-position, upon the deenergization of its operating coil L3, than the time necessary to open the main-circuit contacts L1 and L2 of the rectifier-circuit line-switches L1 and L2, after the deenergization of the energizing-coil circuit 16 of the firing-circuit relay FCR. By this conventional illustration of a slug-ring L3', it is not intended to imply that the motor-circuit line-switch L3 is slow for a main-circuit switch of the necessary capacity. It is meant to indicate that there will be a time-difference of something like 0.1 second, more or less, so that, when the master controller MC is moved from its on-position to its off-position, thereby deenergizing the circuits 14 and 16, the firing-circuit relay FCR will drop out, and the two rectifier-circuit switches L1 and L2 will have at least partially opened their main-circuit contacts L1 and L2, before the motor-circuit line-switch L3 drops out far enough to close its back-contact 18, which thereupon reenergizes the firing-circuit relay FCR, and starts the two rectifier-circuit line-switches L1 and L2 moving in their circuit-closing direction again.

When the motor-circuit line-switch L3 is in its actuated position, it closes an auxiliary make-contact 29, which bypasses the R1 and F3 back-contacts 25 and 26, thus establishing a holding circuit for the line-switch L3.

The previously mentioned circuit 14 is finally shown as having a branch-circuit which extends through an L3 make-contact 30 to a control-circuit 31 which is used, in any desired manner, in the acceleration-control of the traction-motors A1 and A2. A typical control-circuit sequence-chart is shown in Fig. 2, wherein small circles are used to indicate a closed position of the various motor-circuit switches, in accordance with a well-known coinvention. This is only one of a large number of available accelerating-control sequences, any one of which can be utilized with my invention, and the details of which have nothing to do with my invention, other than the fact that some suitable control-means would be provided in any commercial installation.

In operation, when the master controller MC is in its off-position, the motor-circuit line-switch L3 is deenergized at 14, and the firing-circuit relay FCR is energized at 18, so that the firing-circuits IT1, IT2 and IT3, IT4 are not short-circuited at 11 and 12, respectively. Under these circumstances, the rectifying-circuit line-switches L1 and L2 are energized at 20 and 21, respectively, and the four rectifiers T1 to T4 are operating and supplying rectified power to the direct-current circuit X—SWX—7—X"—C1 of the auxiliary loads 7. Thus, there is no interruption of rectified power to the auxiliary loads 7, while the traction-motor circuits are deenergized at L3.

When the master controller is moved from its off-position to its on-position, the circuit 14 energizes the motor-circuit line-switch L3, causing this line-switch to close its main contact L3 and its auxiliary make-contacts 15, 29 and 30, and to open its auxiliary back-contact 18. Preferably, there is an overlap in the operation of the contacts 15 and 18, so that the make-contact 15 closes before the back-contact 18 opens, thus avoiding an unnecessary momentary interruption of the energization of the firing-circuit relay FCR. The rectifiers T1 to T4 continue to operate, now supplying power to the traction-motors A1 and A2, as well as to the auxiliary loads 7.

When the master controller MC is moved from its on-position to its off-position, and before the motor-circuit line-switch L3 can begin to open, the energization of the firing-circuit relay FCR is immediately interrupted, in the off-position of the master-controller segment 13, causing this firing-circuit relay FCR to drop out very fast, thus short-circuiting the firing-circuits of the rectifiers at the FCR back-contacts 11 and 12. This means that, as long as these firing circuits are short-circuited (or otherwise incapacitated), none of the rectifiers T1 and T4 will commence a firing or conducting period again, so that the rectifier-output will cease at the beginning of the next half-cycle after the short-circuiting of the firing-circuits.

The same master-controller off-movement which deenergized the firing-circuit relay FCR is used, in any suitable manner, in accordance with my invention, to deenergize the fast-operating rectifier-circuit line-switches L1 and L2, causing these switches to begin to open their main-circuit contacts L1 and L2. In the illustrated form of embodiment of my invention, I have shown this deenergization of the line-switches L1 and L2 to be brought about by the almost instantaneous opening of the make-contacts 20 and 21 of the firing-circuit relay FCR in response to a deenergization of the master-controller circuit 14, but it is to be understood that the operating-coils L1 and L2 of these line-switches could have been controlled directly from the energizing-circuit 16 of the firing-circuit relay FCR, instead of using the FCR make-contacts 20 and 21 to energize the line-switches L1 and L2.

The essential operation, in accordance with my invention is that the deenergization of the circuit 14—15—16, when the master controller MC is moved from its on-position to its off-position, shall cause the quick deenergizations of the firing-circuit relay FCR and of the two rectifier-circuit line-switches L1 and L2, coupled with the requirement that the firing-circuit relay FCR should close its back-contacts 11 and 12 (thus short-circuiting the firing or ignition-circuits), a trifle over a half-cycle before the opening movement of the line-switches L1 and L2 shall have proceeded far enough to begin to break the contacts at the main-circuit contacts L1 and L2, respectively. Thus, by the time the main-circuit contacts L1 and L2 are broken, there is no rectified current to be interrupted by these contacts, and the switch-life is very greatly increased.

It is also essential that the motor-circuit line-switch L3 shall also break contact at its main-circuit contact L3 at a time which is at least a trifle more than a half-cycle after the closure of the FCR back-contacts 11 and 12 which short-circuit the firing or ignition-circuits IT1 to IT4, so that there will be no rectified motor-energizing current to be interrupted by the final separation of the main-circuit contacts at L3.

It is an essential novel feature of my invention that the opening movement of the motor-circuit line-switch L3 shall automatically and quickly operate (as at 18) to effect reenergizations of the firing-circuit relay FCR and of the two rectifier-circuit line-switches L1 and L2, so as to remove the firing-circuit short-circuits (at 11 and 12) as soon as possible after the main-circuit line-switch contacts L1 and L2 shall have effected a sufficient contact-separation to avoid any danger of striking an arc across these (at least partially) open main-circuit contacts L1 and L2 when ignition-circuit power is again supplied to the rectifiers T1 to T4.

It is desirable that thereafter the rectifier-circuit line-switches L1 and L2 shall reclose as quickly as possible, so as to reduce the time of outage of rectified power-supply to the auxiliary loads 7, to as short a time-interval as is feasible. I have found that a power-outage of 0.1 to 0.3 second duration is quite feasible, and this power-outage time is so short as to be unobjectionable in the operation of the auxiliary load-devices 7, any slight objection to such a brief power-outage being more than outweighed by the longer lives of the line-switches L1, L2 and L3, and by the possibility of greatly reducing the size, the cost and the inertia of these switches, by reason of the fact that said switches are never called upon to interrupt any current, in the normal operation of the equipment.

It is to be understood, that while I have illustrated only a single form of embodiment of my invention, there are many alternative circuit-details which would carry out the essential operational features of the invention, in accordance with the foregoing description, and that the illustrated means for performing the several operational steps are representative of any equivalent means for performing similar steps, in the broader aspects of my invention. It is also to be understood that I have illustrated my invention in a greatly simplified form of embodiment, omitting many well-known features which would be actually used, and might even be necessary, in the acceptable commercial operation of the invention, but which have nothing to do with the novel operational features which I have provided in my present invention. I desire, therefore, that my invention shall be understood as embracing the addition of such additional features, as well as the omission of any illustrated feature for the performance of any functional operation which may not be considered necessary in any specific installation.

I claim as my invention:

1. A rectifier-powered installation comprising: an alternating-current supply circuit; a rectifier-assembly including a control-circuit means for rendering said rectifier-assembly operative or inoperative according as said control-circuit means is in an energizing or a deenergizing condition; a rectifier-circuit switching-means, for connecting said rectifier-assembly to said alternating-current supply-circuit; a common rectified-power circuit, energized by said rectifier-assembly; a plurality of rectifier-powered load-devices, energized from said common rectified-power circuit; a load-circuit switching-means, included in the energizing-circuit connections for one of said load-devices whereby that load-device can be controlled independently of another one of said load-devices; an electrical controlling-means having an on-position and an off-position; a means, which is responsive to said electrical controlling-means when it remains in its off-position, for causing said control-circuit means to remain in its energizing condition, for causing said rectifier-circuit switching-means to remain closed, and for causing said load-circuit switching-means to remain open; a means, which is responsive to said electrical controlling-means when it remains in its on-position, for causing said control-circuit means to remain in its energizing condition, for causing said rectifier-circuit switching-means to remain closed, and for causing said load-circuit switching means to remain closed; and a means, which is responsive to a movement of said electrical controlling-means from its on-position to its off-position, for causing a quick sequence of events in the following order: first, an assumption of the deenergizing condition of said control-circuit means, next an opening of said rectifier-circuit switching means and an opening of said load-circuit switching-means, and next a resumption of the energizing condition of said control circuit means and a reclosure of said rectifier-circuit switching-means.

2. A rectifier-powered installation comprising: an alternating-current supply-circuit; a rectifier-assembly including a control-circuit means for rendering said rectifier-assembly operative or inoperative according as said control-circuit means is in an energizing or a deenergizing condition; a rectifier-circuit switching-means, for connecting said rectifier-assembly to said alternating-current supply-circuit; a common rectified-power circuit, energized by said rectifier-assembly; a plurality of rectified-power load-devices, energized from said common rectified-power circuit; a load-circuit switching-means, included in the energizing-circuit connections for one of said load-devices whereby that load-device can be controlled independently of another one of said load-devices; an electrical controlling-means having an on-position and an off-position; a first interlocking-circuit means, for causing the closure of said load-circuit switching-means to be responsve to an on-position of said electrical controlling-means, and for causing the opening of siad load-circuit switching means to be responsive to an off-position of said electrical controlling-means; a second interlocking-circuit means, for causing the deenergizing condition of said control-circuit means to be responsive to a movement of said electrical controlling-means from an on-position to an off-position while said load-circuit switching-means is closed, and for causing the energizing condition of said control-circuit means to be responsive to an on-position of said electrical controlling-means; a third interlocking-circuit means, for causing the energizing condition of said control-circuit means to be also responsve to an open position of said load-circuit switching-means; and a fourth interlocking-circuit means, for causing the closure of said rectifier-circuit switching-means to be responsive to an energizing condition of said control-circuit means, and for causing the opening of said rectifier-circuit switching-means to be responsive to a deenergizing condition of said control-circuit means; the operations of said control-circuit means and said rectifier-circuit switching-means being fast; and the circuit-opening operation of said load-circuit switching-means being sufficiently slow so that its open position will cause the third interlocking-circuit means to operate said control-circuit means to an energizing condition, very soon after the circuit-opening movement of said rectifier-circuit switching means.

3. A rectifier-powered installation comprising: an alternating-current supply-circuit; an ignitron-assembly including a firing-circuit preventive-means for preventing the ignitrons of said assembly from starting any more half-cycle conducting-periods while said firing-circuit preventive-means is in its preventive condition, and for causing each ignitron of said assembly to recommence its half-cycle conducting-periods in successive times as its igniter becomes intermittently energized while said firing-circuit preventive-means is in its firing condition; a rectifier-circuit switching-means, for connecting said ignitron-assembly to said alternating-current supply-circuit; a common rectified-power circuit, energized by said ignitron-assembly; a plurality of rectifier-powered load-devices, energized from said common rectified-power circuit; a load-circuit switching-means, included in the energizing-circuit connections for one of said load-devices whereby that load-device can be controlled independently of another one of said load-devices; an electrical controlling-means having an on-position and an off-position; a means, which is responsive to said electrical controlling-means when it remains in its off-position, for causing said firing-circuit preventive-means to remain in its firing condition, for causing said rectifier-circuit switching-means to remain closed, and for causing said load-circuit switching-means to remain open; a means, which is responsive to said electrical controlling-means when it remains in its on-position, for causing said firing-circuit preventive-means to remain in its firing condition, for causing said rectifier-circuit switching means to remain closed, and for causing said load-circuit switching-means to remain closed; and a means, which is responsive to a movement of said electrical controlling-means from its on-position to its off-position, for causing a quick sequence of events in the following order: first, an assumption of the preventive condition of said firing-circuit preventive-means, next an opening of said rectifier-circuit switching-means and an opening of said load-circuit switching-means, occurring after a time-interval of more than a half-cycle after the assumption of the preventive condition of said firing-circuit preventive-means, and next a resumption of the firing condition of said firing-circuit preventive-means and a reclosure of said rectifier-circuit switching-means.

4. A rectifier-powered installation comprising: an alternating-current supply-circuit; an ignitron-assembly including a firing-circuit preventive-means for preventing the ignitrons of said assembly from starting any more half-cycle conducting-periods while said firing-circuit preventive-means is in its preventive condition, and for causing each ignitron of said assembly to recommence its half-cycle conducting-periods in successive times as its ignitor becomes intermittently energized while said firing-circuit preventive-means is in its firing condition; a rectifier-circuit switching-means, for connecting said ignitron-assembly to said alternating-current supply-circuit; a common rectified-power circuit, energized by said ignitron-assembly; a plurality of rectifier-powered load-devices, energized from said common rectified-power circuit; a load-circuit switching-means, included in the energizing-circuit connections for one of said load-devices whereby that load-device can be controlled independently of another one of said load-devices; an electrical controlling-means having an on-position and an off-position; a first interlocking-circuit means, for causing the closure of said load-circuit switching-means to be responsive to an on-position of said electrical controlling-means, and for causing the opening of said load-circuit switching-means to be responsive to an off-position of said electrical controlling-means; a second interlocking-circuit means, for causing the preventive condition of said firing-circuit preventive-means to be responsive to a movement of said electrical controlling-means from an on-position to an off-position while said load-circuit switching-means is closed, and for causing the firing condition of said firing-circuit preventive-means to be responsive to an on-position of said electrical controlling-means; a third interlocking-circuit means, for causing the firing condition of said firing-circuit preventive-means to be also responsive to an open position of said load-circuit switching-means; and a fourth interlocking-circuit means, for causing the closure of said rectifier-circuit switching-means to be responsive to a firing condition of said firing-circuit preventive means, and for causing the opening of said rectifier-circuit switching-means to be responsive to a preventive condition of said firing-circuit preventive-means; the operations of said firing-circuit preventive-means and said rectifier-circuit switching-means being fast; the time required for the opening movement of the rectifier-circuit switching-means being such that said opening occurs after a time-interval of more than a half-cycle after the assumption of the preventive condition of said firing-circuit preventive-means; and the circuit-opening operation of said load-circuit switching-means being sufficiently slow so that its open position will cause the third interlocking-circuit means to operate said firing-circuit preventive-means to a firing condition, very soon after the circuit-opening movement of said rectifier-circuit switching-means.

No references cited.